B. FORD.
STORAGE BATTERY PLATE.
APPLICATION FILED JAN. 23, 1920.

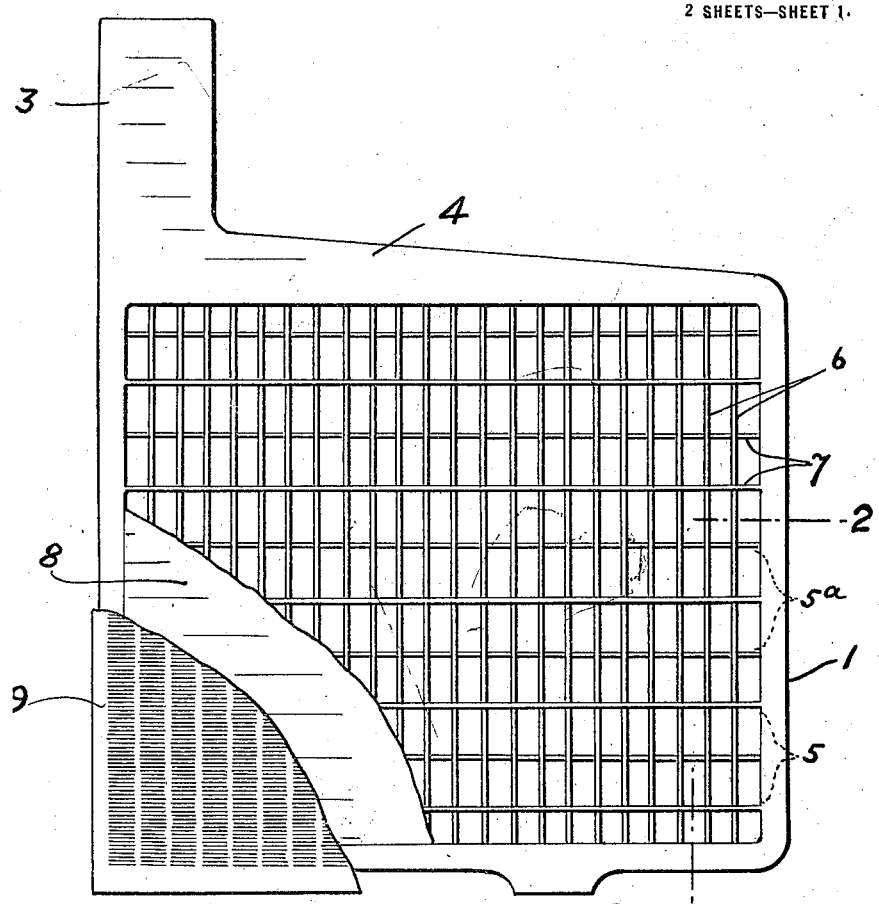
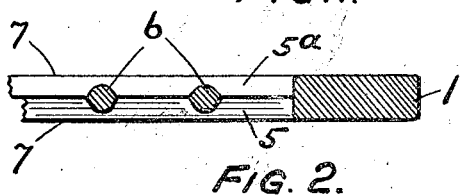
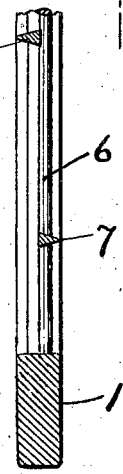
B. FORD.
STORAGE BATTERY PLATE.
APPLICATION FILED JAN. 23, 1920.
1,370,013.
Patented Mar. 1, 1921.
2 SHEETS—SHEET 1.
FIG. 1.
FIG. 2.
FIG. 3.
WITNESS:
INVENTOR
Bruce Ford
BY
Augustus B. Stoughton
ATTORNEY.

1,370,013.

Patented Mar. 1, 1921.
2 SHEETS—SHEET 2.

WITNESS:

INVENTOR
Bruce Ford
BY
Augustus B. Stoughton
ATTORNEY.

UNITED STATES PATENT OFFICE.

BRUCE FORD, OF PHILADELPHIA, PENNSYLVANIA.

STORAGE-BATTERY PLATE.

1,370,013.   Specification of Letters Patent.   Patented Mar. 1, 1921.

Application filed January 23, 1920. Serial No. 353,485.

*To all whom it may concern:*

Be it known that I, BRUCE FORD, a citizen of the United States, residing at Philadelphia, in the county of Philadelphia and State of Pennsylvania, have invented certain new and useful Improvements in Storage-Battery Plates, of which the following is a specification.

The principal object of the present invention is to provide a plate well adapted for use in starting automobile engines and for other purposes, in that a battery consisting of an assemblage of such plates will possess the characteristic of delivering current at a high rate with comparatively little loss in voltage.

The above object is attained by the provision in a given size of plate and given weight of grid, of increased active surface and increased current conductivity of the grid either or both of which, in respect to known commercial batteries constituting a standard of comparison, gives high voltage on rapid rates of discharge.

Generally stated, the invention consists in a novel combination of the paste or active material or material to become active and the parts of the grid as well as in a novel construction and arrangement of the grid itself. Heretofore it has been the practice to make the current conducting portions of the grid of substantial width at the plate surface and also to distribute a substantial amount of the grid portion at the surface of the plate to act as a retainer for the active material in order to retard the sloughing off of the latter during the working life of the battery. Such arrangement of the grid portions tends to reduce the working surface of the active material and also the actual quantity of the active material which can be applied to a plate of given size, and furthermore it has been found that corrosion and disintegration of the grids of positive pole plates during the life of the plates is more rapid where the grid is exposed at the surface of the plate than where the grid portion is buried and surrounded by the active material. The present invention contemplates a redistribution of grid material so that substantially all the current conducting portions will be embedded in the active material and thus be protected against corrosion and also will not reduce the active plate surface; and furthermore some of the grid material which has heretofore been used for retaining the active material may be eliminated or may be applied to those other portions of the grid which serve to conduct the current. In carrying out this invention I provide a relatively large number of vertical grid bars, the total cross sectional area of which is a substantial amount since the current generated in the plate travels mostly in a vertical direction because the plate connection lugs are located at the top of the plate. These vertical conducting bars are located substantially at the center line between the two faces of the plate in order that the bars may be surrounded by the active material and thereby not reduce the active surface of the latter, and these bars are held in alinement and tied together by horizontal bars, the total cross sectional area of which may be considerably less than that of the vertical bars per square unit of plate since their function is primarily to tie the grid parts together and their conductivity is of little moment.

In order to provide a limiting plane for the purpose of applying the active material to its desired plane surface a portion of the horizontal tie-bars are brought to the surface of the plate, but where such bars extend to the surface they are preferably very narrow—practically a knife edge—in order that the active surface of the plate shall be as great as possible. A large uninterrupted surface of active material is prone to develop surface cracks and the facially extending horizontal bars have an additional function in serving to subdivide the surface. There has been considerable development in the storage battery art in increasing the efficiency of retaining walls or sheets applied to the face of the plates to prevent the sloughing off of the active material and some of these retainers, such as perforated hard rubber sheets used mostly against the faces of positive pole plates, or sheets of wood used mostly against the faces of negative pole plates, are so effective that I have found that much of the grid portion heretofore employed to act as active material retainer can, when such sheets are used, be eliminated or redistributed and utilized more efficiently in the operation of the battery, by relying upon the retaining wall or sheet, rather than upon the plate grid itself, to prevent the sloughing of the active material.

The invention will be claimed at the end hereof, but will be first described in connection with the accompanying drawings forming part hereof and in which—

Figure 1, is a side view with parts broken away of a plate embodying features of the invention.

Fig. 2, is a sectional view, drawn to an enlarged scale, and taken on the line 2, of Fig. 1.

Fig. 3, is a similar view taken on the line 3, of Fig. 1.

Figure 4:
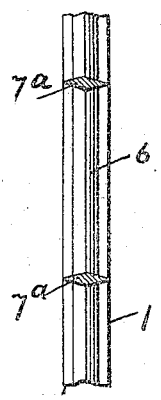
Figs. 4 to 8, are views similar to Fig. 3, and showing modifications.
Figure 5:
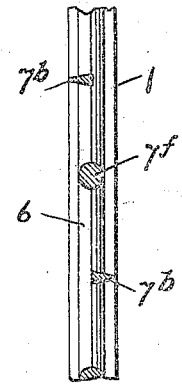
Figure 6:
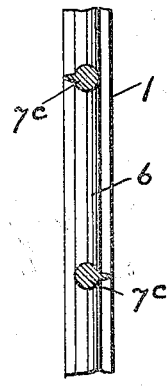
Figure 7:
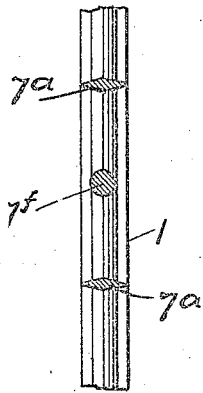
Figure 8:
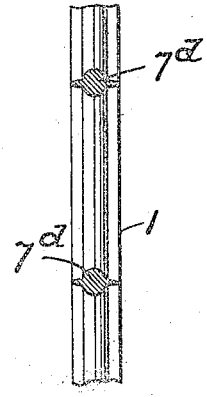

In the drawing 1, is a hollow rectangular marginal frame, shown as provided with a lug 3, having a tapering extension 4, which provides good horizontal conductivity. This frame 1, surrounds a grillage provided with horizontal cavities 5 and 5ª, which are continuous in that their surfaces are uninterrupted across the faces of the grillage. The grillage consists of vertical rods 6, all confined to the median portion of the frame, and of horizontal tie-bars 7, 7ª, 7ᵇ, 7ᶜ, and 7ᵈ, extending outwardly and terminating at the faces of the plate. As shown in Figs. 5 and 7, additional tie-bars 7ᵗ, are provided and as shown they do not extend to the surfaces of the plate. The tie-bars may be of less cross section than the rods 6, and in a square plate they are preferably not so numerous as the rods. This provides for a large active surface, because the major portions of the grillage including the rods 6, are buried in the active material or material to become active and only the edges of the tie-bars 7, appear at the faces. The active material 8, is arranged in the cavities 5 and 5ª, and presents a horizontally unbroken surface extending entirely across the grillage.

Figure 9:
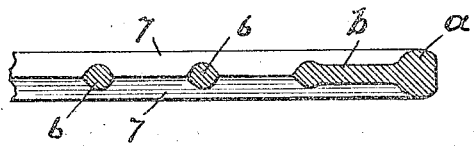
Fig. 9, is a horizontal sectional view illustrating a modification in the cross section of the marginal frame of the grid.

In Fig. 9, the marginal frame of the grid is shown as provided with a marginal bead $a$, and an inwardly projecting web $b$. The bead $a$, is of substantially the thickness of the plate and the web $b$, is thinner. The active material thereby has an increased surface and protects the web covered by it. In the construction shown the tie-bars 7, extend across the web to the bead, and the cavities for active material or material to become active therefore extend across the webs of the sides of the frame to the bead.

From the foregoing description it is evident that the active surface is large and that the quantity of active material may also be large, since the amount of metal in the grillage may be relatively small.

The comparatively numerous vertical rods 6, being buried, do not diminish the active surface, but they provide good vertical conductivity. 9, is a separator or retainer of any of the types successfully used for this purpose. As shown it consists of a horizontally slotted sheet of rubber or rubber material.

It will be obvious to those skilled in the art to which the invention relates that modifications can be made in details of construction and arrangement without departing from the spirit of the invention, hence the latter is not limited as to such matters or otherwise than as the prior art and the appended claims may require.

I claim.

1. A grid for storage battery plate comprising in combination, a rectangular marginal frame surrounding a unitary grillage consisting of vertical rods all confined to the median portion between the faces, and horizontal tie-bars extending outwardly to the opposite faces and providing horizontal and facially uninterrupted cavities entirely across the grillage between said horizontal tie-bars and terminating at the marginal frame.

2. In the storage battery plate the combination of a unitary grillage consisting of vertical rods confined to a median portion and horizontal bars flush with the faces of the grillage, and active material in which the vertical rods are buried and which presents an unbroken surface entirely across the grillage between the horizontal bars, substantially as described.

3. In a storage battery plate the combination of a unitary grillage consisting of vertical rods confined to a median portion and horizontal tie-bars of less cross section in the aggregate per square unit of grillage than the rods and flush with the faces, and active material in which the vertical rods are buried and which presents an unbroken surface across the grillage and between the tie-bars, substantially as described.

4. A storage battery plate comprising the combination of a rectangular marginal frame, consisting of a marginal bead of substantially the thickness of the plate and an inwardly extending and thinner web, surrounding a unitary grillage consisting of vertical rods confined to the plane of the web and of horizontal tie-bars flush with the faces of the plate, and active material in which the rods and webs are buried and which presents an unbroken surface extending entirely across the grillage between said horizontal tie-bars and terminating at the bead, substantially as described.

5. In a storage battery and in combination, active material or material adapted to become active, a unitary grillage of vertical rods buried in the active material and of relatively few and widely spaced horizontal rods flush with the faces of the active material and affording relatively little retaining means therefor, and a retaining wall or sheet applied to the active material constituting the major retaining means, substantially as described.

BRUCE FORD.